US012673648B2

(12) United States Patent
Lippmann et al.

(10) Patent No.: US 12,673,648 B2
(45) Date of Patent: Jul. 7, 2026

(54) HYDRAULIC PUMP

(71) Applicant: REE AUTOMOTIVE LTD, Glil-Yam (IL)

(72) Inventors: Tomer Lippmann, Glil-Yam (IL); Tomer Schindler, Tel-Aviv (IL); Zohar Goldenstein, Nes-Tziyona (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 500 days.

(21) Appl. No.: 18/359,153

(22) Filed: Jul. 26, 2023

(65) Prior Publication Data

US 2023/0400021 A1    Dec. 14, 2023

Related U.S. Application Data

(63) Continuation of application No. PCT/IL2023/050345, filed on Apr. 2, 2023.

(60) Provisional application No. 63/330,350, filed on Apr. 13, 2022.

(51) Int. Cl.
*B60T 13/16* (2006.01)
*F04C 2/107* (2006.01)

(52) U.S. Cl.
CPC ............ *B60T 13/16* (2013.01); *F04C 2/1073* (2013.01)

(58) Field of Classification Search
CPC ........ B60T 13/16; B60T 13/168; B60T 17/02; F04B 9/02; F04B 17/03; F04B 19/02; F04C 2/1073
USPC ....................................................... 188/152
See application file for complete search history.

(56) References Cited

U.S. PATENT DOCUMENTS

| | | | |
|---|---|---|---|
| 4,543,789 A * | 10/1985 | Norton | F04B 5/00 |
| | | | 417/302 |
| 4,918,921 A | 4/1990 | Leigh-Monstevens et al. | |
| 5,788,341 A | 8/1998 | Penrod et al. | |
| 5,826,952 A | 10/1998 | Feigel et al. | |
| 6,079,797 A | 6/2000 | Ganzel | |
| 6,367,592 B1 | 4/2002 | Kapaan et al. | |
| 7,347,115 B2 | 3/2008 | Otaki et al. | |
| 8,540,324 B2 | 9/2013 | Leiber et al. | |
| 10,112,592 B2 | 10/2018 | Leiber et al. | |

(Continued)

FOREIGN PATENT DOCUMENTS

| | | |
|---|---|---|
| CN | 104837696 | 8/2015 |
| CN | 107002644 | 8/2017 |
| CN | 108290562 | 7/2018 |

(Continued)

OTHER PUBLICATIONS

Gong et al., Review on the Development, Control Method and Application Prospect of Brake-by-Wire Actuator, Actuators 2020, 9, 15 from www.mdpi.com/journal/actuators.

*Primary Examiner* — Thomas J Williams
*Assistant Examiner* — San M Aung
(74) *Attorney, Agent, or Firm* — PEARL COHEN ZEDEK LATZER BARATZ LLP

(57) ABSTRACT

A hydraulic pump may include: a screw including: an internal tubular cavity, and an internal port in fluid communication with the internal tubular cavity; a nut surrounding a longitudinal portion of the screw; and a cylindrical tube fitting within the internal tubular cavity of the screw, the cylindrical tube having a hollow channel that is in fluid communication with the internal tubular cavity of the screw.

26 Claims, 13 Drawing Sheets

100

View AA:

(56)        References Cited

U.S. PATENT DOCUMENTS 10,250,098  B2      4/2019  Leiber et al.
2017/0259799  A1 *   9/2017  Weh ......................... F04B 9/02

FOREIGN PATENT DOCUMENTS

CN           111102155          5/2020
DE             3813622  A1 *  11/1989   .............. B60T 8/446
DE             4132930  A1 *   4/1993   ............ F04B 43/025
DE        102012222575  A1 *   6/2014   .............. H02K 7/14
KR           200326240  Y1     9/2003
WO      WO 2021260633          12/2021

* cited by examiner

100

102

B

A

A

B

100

*View AA:*

<u>100</u>

*View BB:*

100

102

<u>100</u>

*View AA:*

DETAIL C

DETAIL D

100

100

100

200

200

DETAIL F

HYDRAULIC PUMP

CROSS-REFERENCE TO RELATED APPLICATIONS

This application is a continuation of PCT International Application No. PCT/IL2023/050345, International Filing Date Apr. 2, 2023, which claims the benefit of U.S. Provisional Patent Application No. 63/330,350, filed Apr. 13, 2022, which are hereby incorporated by reference in their entirety.

FIELD OF THE INVENTION

The present invention relates to the field of hydraulic pumps, and more particularly, to hydraulic pumps for vehicle brake systems.

BACKGROUND OF THE INVENTION

Some typical vehicle brake systems include non-linear hydraulic pumps, such as electrical or pressure pumps, to circulate brake liquid between brake liquid reservoirs and brake actuators. However, non-linear hydraulic pumps are typically bulky and may be limited in their power output. Some other typical vehicle brake systems include linear axial hydraulic pumps. However, linear axial hydraulic pumps typically occupy significant space in their respective axial direction due to the axial arrangement and motion of their components.

SUMMARY OF THE INVENTION

Some embodiments of the present invention may provide a hydraulic pump which may include: a screw including: an internal tubular cavity, and an internal port in fluid communication with the internal tubular cavity; a nut surrounding a longitudinal portion of the screw; and a cylindrical tube fitting within the internal tubular cavity of the screw, the cylindrical tube having a hollow channel that is in fluid communication with the internal tubular cavity of the screw.

In some embodiments, the hydraulic pump includes a motor to rotate the nut about a longitudinal axis to cause linear motion of the screw with respect to the cylindrical tube.

In some embodiments, the hydraulic pump includes a housing accommodating the screw, the nut and the cylindrical tube.

In some embodiments, the cylindrical tube is rigidly connected to the housing and is static with respect to the screw.

In some embodiments, the screw includes an internal source tubular cavity in fluid communication with the internal tubular cavity through the internal port of the internal tubular cavity.

In some embodiments, the hydraulic pump includes a source cylindrical tube fitting within the internal source tubular cavity of the screw, the source cylindrical tube includes a hollow channel that is in fluid communication with the internal source tubular cavity of the screw.

In some embodiments, the hydraulic pump includes a rigid conduit rigidly coupled within the screw and extending into the internal source tubular cavity of the screw and the hollow channel of the source cylindrical tube, the rigid conduit including a hollow channel extending through the length of the rigid conduit.

In some embodiments, the hydraulic pump includes a sealing member on an external surface of the rigid conduit, the sealing member sealing the rigid conduit within the hollow channel of the source cylindrical tube.

In some embodiments, the source cylindrical tube and the internal source tubular cavity include mating longitudinal protrusion and longitudinal groove.

In some embodiments, linear motion of the screw generates pressure difference between the internal tubular cavity and the internal source tubular cavity.

In some embodiments, the motor is a direct drive motor.

In some embodiments, the hydraulic pump includes a sealing member to seal the cylindrical tube within the internal tubular cavity of the screw.

In some embodiments, the hydraulic pump includes a sensor to generate signals indicative of at least one of an occurrence, direction, position and velocity of the screw.

In some embodiments, the hydraulic pump includes a pressure gauge in fluid communication with at least one of two or more ports of the cylindrical tube.

In some embodiments, the hydraulic pump includes a controller to control the motor.

In some embodiments, the hydraulic pump includes a valve positioned at the internal port of the screw to control flow of liquid through the internal port.

In some embodiments, the hydraulic pump includes a piston assembly positioned within the internal tubular cavity of the screw to control flow of liquid through the internal port.

In some embodiments, the piston assembly includes a spring-loaded piston, the spring-loaded piston includes: a shaft positioned and movable within a longitudinal receptacle in the cylindrical tube, and a piston head connected to one end of the shaft.

In some embodiments, the diameter of the piston head is: greater than the diameter of the internal port, and smaller than the diameter of the internal tubular cavity such a gap is formed between an internal surface of the internal tubular cavity and an external side surface of the piton head.

In some embodiments, the hollow channel of the cylindrical tube is parallel to and radially offset with respect to the longitudinal receptacle.

In some embodiments, the piston assembly includes a sealing nut connectable to one end of the cylindrical tube, the sealing nut includes a sealing member on an external surface of the sealing nut to seal the cylindrical tube with respect to the internal tubular cavity of the screw.

In some embodiments, the sealing nut includes: a first hollow channel in fluid communication with the longitudinal receptacle of the cylindrical tube and receiving a longitudinal portion of the shaft of the piston; and a second hollow channel in fluid communication with the hollow channel of the cylindrical tube and establishing fluid communication between the hollow chamber of the cylindrical tube and the internal tubular cavity of the screw.

In some embodiments, the piston assembly is to damp pressure fluctuations within the internal tubular cavity of the screw.

In some embodiments, the hydraulic pump includes: a pressure sensor; and a pressure sensor coupler to couple the pressure sensor to a housing of the hydraulic pump, the pressure sensor coupler including a hollow channel extending through the pressure sensor coupler and being in fluid communication with the pressure sensor and the internal tubular cavity of the screw.

Some embodiments of the present invention provide a brake system which may include: a brake liquid reservoir; a brake actuator; and the hydraulic pump described herein, the hydraulic pump being in fluid communication with the brake liquid reservoir and the brake actuator.

In some embodiments, the brake system includes a controller to control the hydraulic pump to circulate brake liquid between the brake actuator and the brake actuator.

Some embodiments of the present invention provide a wheel corner system which may include: a sub-frame; a wheel hub rotatably coupled to the sub-frame; a brake liquid reservoir coupled to the sub-frame; a brake actuator coupled to the wheel hub; and the hydraulic pump as described herein, the hydraulic pump being coupled to the sub-frame and being in fluid communication with the brake liquid reservoir and the brake actuator.

In some embodiments, the wheel corner system includes a controller to control the hydraulic pump to circulate brake liquid between the brake liquid reservoir and the brake actuator so as to control rotation rate of the wheel hub.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout. In the accompanying drawings.

Figure 1A:
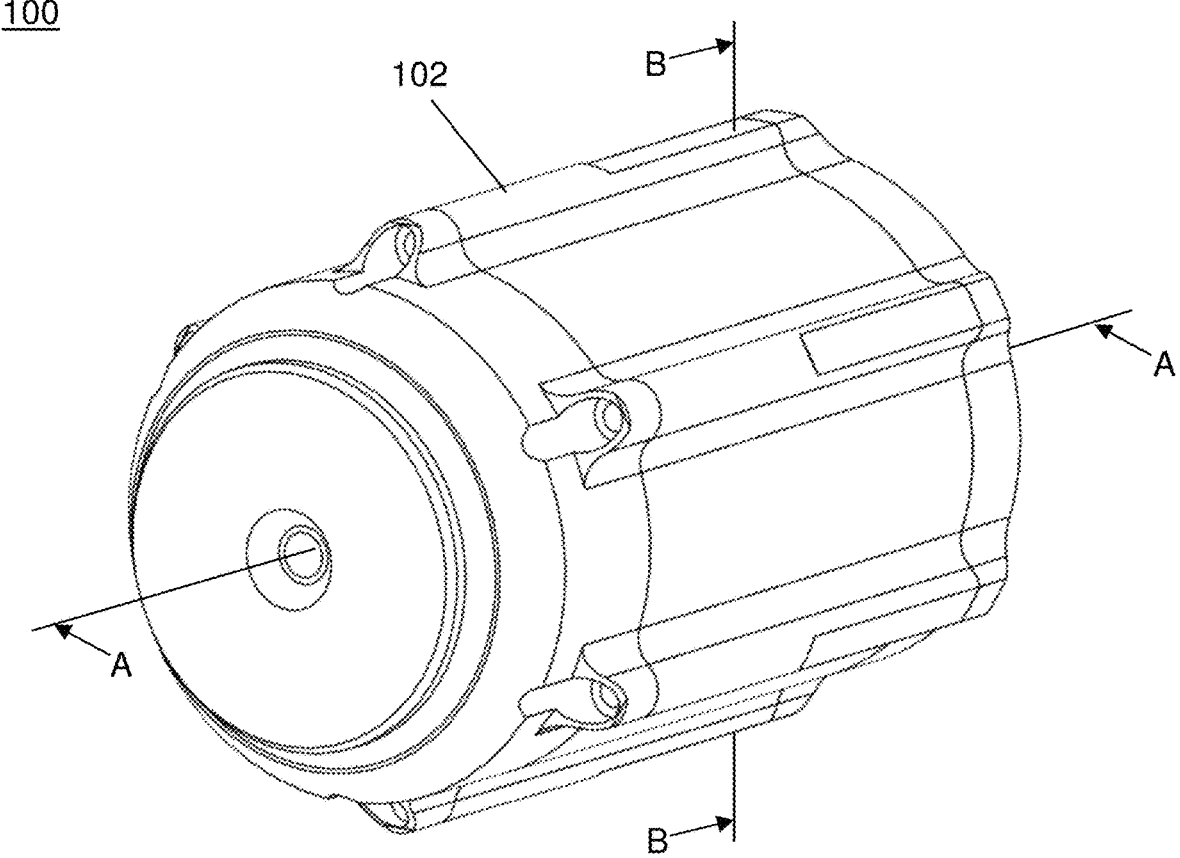
FIG. 1A is a three-dimensional (3D) diagram of a hydraulic pump, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Reference is made to FIG. 1A, which is a 3D diagram of a hydraulic pump 100, according to some embodiments of the invention.

Figure 1B:
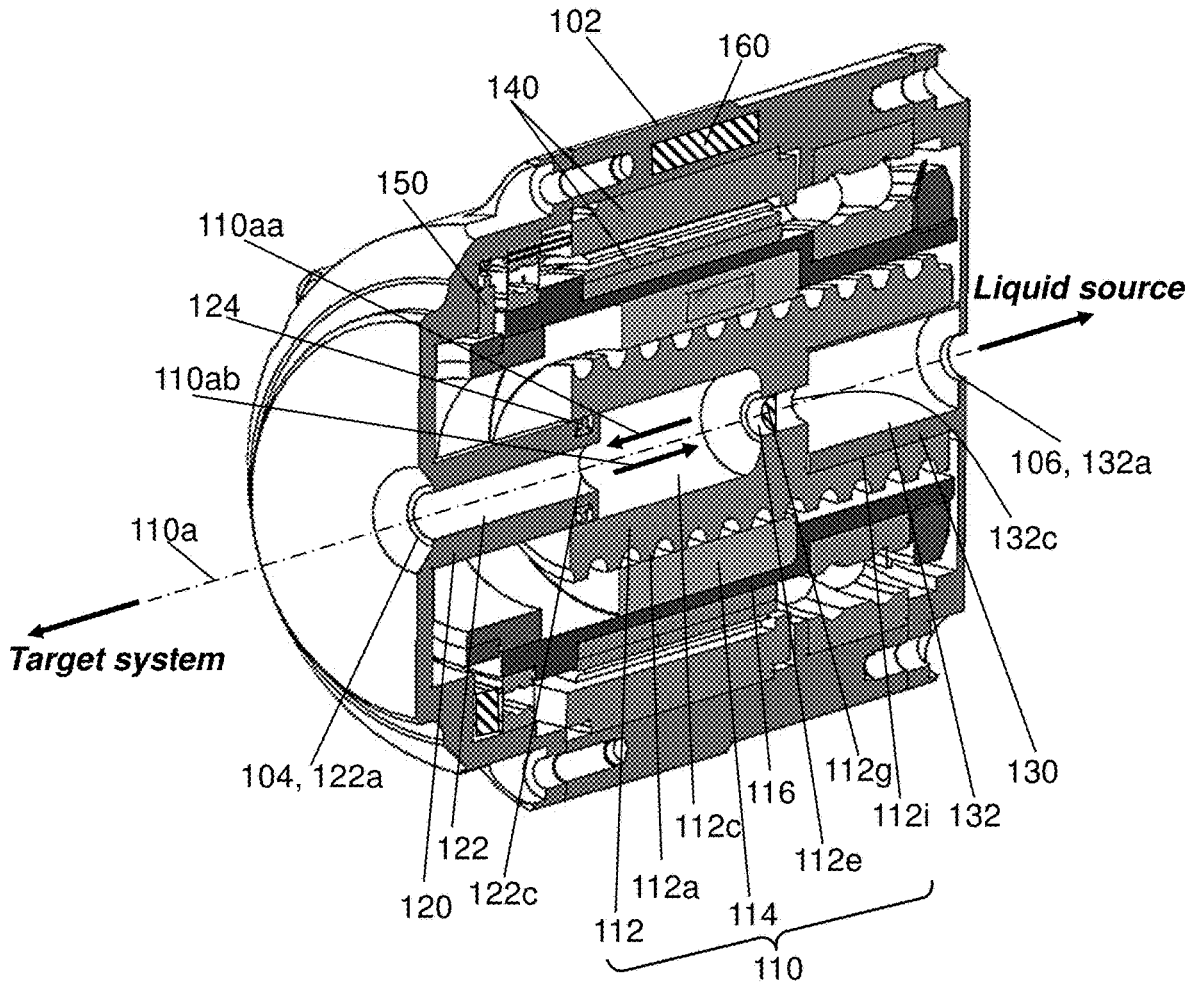
FIG. 1B is a 3D diagram of a partial longitudinal section view of the hydraulic pump along line AA of FIG. 1A, according to some embodiments of the invention.

Reference is also made to FIG. 1B, which is a 3D diagram of a partial longitudinal section view of hydraulic pump 100 along line AA of FIG. 1A, according to some embodiments of the invention.

Figure 1C:
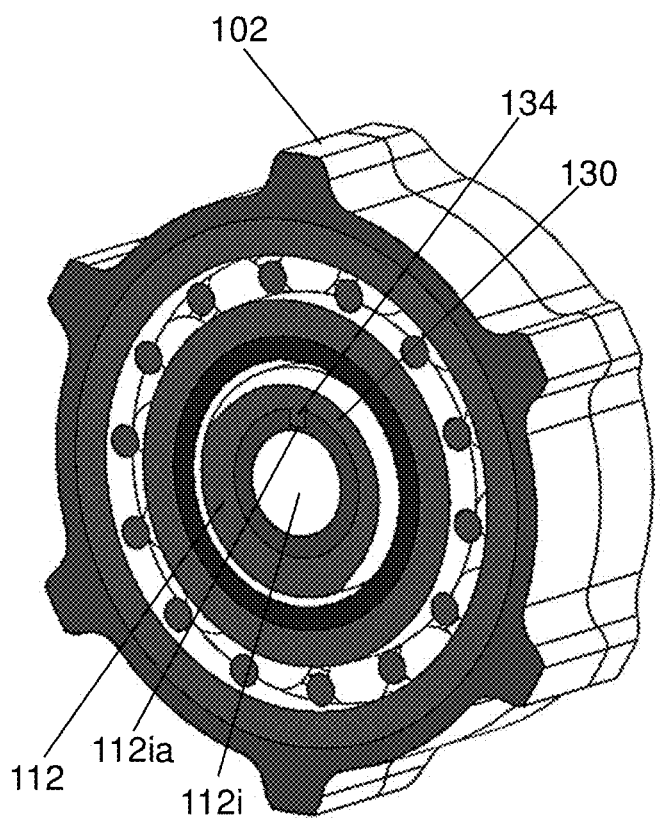
FIG. 1C is a 3D diagram of a partial cross-section view of the hydraulic pump along line BB of FIG. 1A, according to some embodiments of the invention.

Reference is also made to FIG. 1C, which is a 3D diagram of a partial cross-section view of hydraulic pump 100 along line BB of FIG. 1A, according to some embodiments of the invention.

Hydraulic pump 100 may be a positive displacement pump that may repeatedly move and/or circulate liquid between a target system and a liquid source.

Hydraulic pump 100 may include a housing 102 to accommodate one or more components of hydraulic pump 100. Housing 102 may include a first port (e.g., opening) 104 and a second port (e.g., opening) 106 (e.g., as shown in FIG. 1B). First port 104 of housing 102 may be connected (e.g., fluidly connected) to, for example, the target system (e.g., friction-based brake actuator (such as a caliper) in vehicle corner module brake system; e.g., as described below with respect to FIGS. 5A-5C). Second port 106 of housing 102 may be fluidly connected to, for example, the liquid source (e.g., a brake liquid reservoir; as described below with respect to FIGS. 5A-5C).

Hydraulic pump 100 may include a screw-nut assembly 110 positioned within housing 102. Screw-nut assembly 110 may include a screw 112 and a nut 114.

Screw 112 of screw-nut assembly 110 may be a cylindrical body including a plurality of helical grooves 112*a* on an external surface of the cylindrical body. Screw 112 may include an internal first (e.g., pressure) tubular cavity 112*c*. First internal tubular cavity 112*c* of screw 112 may be in fluid communication with the target system (e.g., as described hereinbelow). Screw 112 may include an internal port (e.g., channel) 112*e* in fluid communication with first internal tubular cavity 112*c* of screw 112. Screw 112 may include a valve 112*g* positioned at internal port 112*e* of screw 112. In some embodiments, valve 112*g* is a one-way valve that is to allow fluid flow into cavity 112*c*. In some embodiments, valve 112*g* is a two-way non-return valve that is to allow fluid flow into cavity 112*c* and to release fluid outside cavity 112*c* towards second port 106.

In some embodiments, screw 112 includes an internal second (e.g., source) tubular cavity 112*i*. Second internal tubular cavity 112*i* may be in fluid communication with first internal tubular cavity 112*c* through internal port 112*e* of screw 112. Second internal tubular cavity 112*i* may be in fluid communication with the liquid source (e.g., as described hereinbelow) via second port 106.

Nut 114 of screw-nut assembly 110 may be a cylindrical annular body including a plurality of grooves (not shown) on an internal surface of the cylindrical annular body. Nut 114 may surround a longitudinal portion of screw 112. In some embodiments, screw-nut assembly 110 includes a sleeve 116 surrounding screw-nut assembly 110. Screw-nut assembly 110 may be, for example, balls screw-nut assembly further including a plurality of balls positioned between screw 112 and nut 114. However, different types of screw-nut assemblies may be used.

Hydraulic pump 100 may include a first (e.g., pressure) cylindrical tube 120 fitting within first (e.g., pressure) internal tubular cavity 112*c* of screw 112. First cylindrical tube 120 may include a hollow channel (e.g., interior) 122 extending through the entire length of first cylindrical tube 120. Hollow channel 122 of first cylindrical tube 120 may include a first port (e.g., opening) 122*a* and a second port (e.g., opening) 122*c*. Second port 122*c* may be in fluid communication with first port 122*a*. First cylindrical tube 120 may be rigidly connected to or may be an integral portion of housing 102 such that first port 122*a* of first cylindrical tube 120 coincides with first port 104 of housing 102 to form the fluid connection between first internal tubular cavity 112*c* of screw 112 with the target system (e.g., as shown in FIG. 1B). In some embodiments, first cylindrical tube 120 includes a sealing member 124 (e.g., such as O-Ring as shown in FIG. 1B) to seal first cylindrical tube 120 within first internal tubular cavity 112*c* of screw 112.

In some embodiments, hydraulic pump 100 includes a second (e.g., source) cylindrical tube 130 fitting within second (e.g., source) internal tubular cavity 112*i* of screw 112. Second cylindrical tube 130 may include a hollow channel (e.g., interior) 132 extending through the entire length of second cylindrical tube 130. Hollow channel 132 of second cylindrical tube 130 may include a first port (e.g., opening) 132*a* and a second port (e.g., opening) 132*c*. Second cylindrical tube 130 may be rigidly connected to or may be an integral portion of housing 102 such that first port

132*a* of second cylindrical tube 130 coincides with second port 106 of housing 102 to form the fluid connection between second internal tubular cavity 112*i* of screw 112 with the liquid source (e.g., as shown in FIG. 1B).

In some embodiments, second internal tubular cavity 112*i* of screw 112 and second cylindrical tube 130 include mating longitudinal protrusion and groove. For example, as shown in FIG. 1C, second cylindrical tube 130 may include a longitudinal protrusion 134 protruding outwardly from an external surface of second cylindrical tube 130. In the same example, second internal tubular cavity 112*i* of screw 112 may include a longitudinal groove 112*ia* mating with longitudinal protrusion 134 of second cylindrical tube 130. In another example, second cylindrical tube 130 may include a longitudinal groove and second internal tubular cavity 112*i* of screw 112 may include a longitudinal protrusion mating with the longitudinal groove of second cylindrical tube 130.

Rotation of nut 114 may cause linear motion of screw 112 of screw-nut assembly 110. For example, rotation of nut 114 in a first rotational direction may cause screw 112 to move in a first longitudinal direction 110*aa* towards first cylindrical tube 120 and away from second cylindrical tube 130, and rotation of nut 114 in opposing second rotational direction may cause screw 112 to move in opposing second longitudinal direction 110*ab* away from first cylindrical tube 120 and towards second cylindrical tube 130, wherein first cylindrical tube 120 and second cylindrical tube 130 being rigidly connected to housing 102.

Hydraulic pump 100 may include a motor 140. Motor 140 may be positioned within housing 102. Motor 140 may rotate nut 114 of screw-nut assembly 110 about a longitudinal axis 110*a* of screw-nut assembly 110 (e.g., being also a longitudinal axis of screw 112 and a longitudinal axis of nut 114; e.g., as shown in FIG. 1B). In some embodiments, motor 140 is a direct drive motor surrounding nut 114 of screw-nut assembly 110 (e.g., as shown in FIG. 1B). However, different types of motors may be used to rotate nut 114 about longitudinal axis 110*a* of screw-nut assembly 110.

Hydraulic pump 100 may include a sensor 150. Sensor 150 may generate signals indicative of at least one of an occurrence, direction, position or velocity of screw 112 of screw-nut assembly 110. For example, sensor 150 may be an incremental sensor. Other examples of sensor 150 may include a multiturn sensor and an absolute sensor.

In some embodiments, hydraulic pump 100 includes a controller 160. Controller 160 may control operation of valve 112*g* and motor 140, e.g., based on the signals from sensor 150 and/or input signals, to cause hydraulic pump 100 to circulate liquid between the target system and the liquid source. Controlled operation of motor 140 and valve 112*g* may cause hydraulic pump 100 to drive the liquid from the liquid source to the target system or from the target system to the liquid source as described hereinbelow.

In operation, if it is desired to drive liquid from the liquid source to the target system, controller 160 may control motor 140 to rotate nut 114 in the first rotation direction to cause linear motion of screw 112 in first longitudinal direction 110*aa* and control valve 112*g* to prevent back flow of liquid in second longitudinal direction 110*ab* from first internal tubular cavity 112*c* to second internal tubular cavity 112*i*. Linear motion of screw 112 in first longitudinal direction 110*aa* and prevention of backflow of liquid in second longitudinal direction 110*ab* may generate a total positive pressure gradient in first longitudinal direction 110*aa* to drive the liquid from first internal tubular cavity 112*c* to the target system.

In operation, if it is desired to drive liquid from the target system to the liquid source, controller 160 may control motor 140 to rotate nut 114 in the second rotation direction to cause linear motion of screw 112 in second longitudinal direction 110*ab* and control valve 112*g* to prevent back flow of liquid in first longitudinal direction 110*aa* from second internal tubular cavity 112*i* to first internal tubular cavity 112*c*. Linear motion of screw 112 in second longitudinal direction 110*ab* and prevention of backflow of liquid in first longitudinal direction 110*aa* may generate a total positive pressure gradient in second longitudinal direction 110*ab* to drive the liquid from the target system to the liquid source.

In some embodiments, hydraulic pump 100 has no controller. Hydraulic pump 100 may be in communication with an external controller (e.g., such as a controller of a wheel corner system of a controller of a vehicle platform, as described herein below) that may control motor 140 and valve 112*g* of hydraulic pump 100 to circulate the liquid between the liquid source and the target system (e.g., as described hereinabove).

Figure 2A:
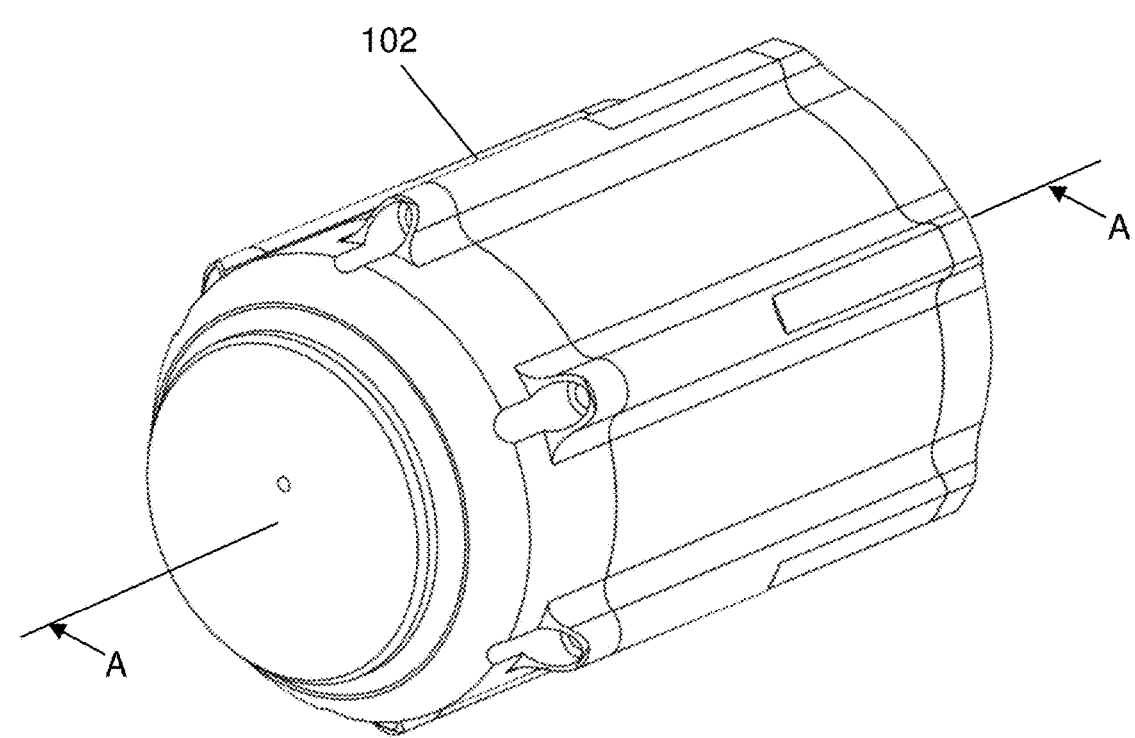
FIG. 2A is a 3D diagram of the hydraulic pump including a piston assembly, according to some embodiments of the invention.

Reference is made to FIG. 2A, which is a 3D diagram of hydraulic pump 100 including a piston assembly 170, according to some embodiments of the invention.

Figure 2B:
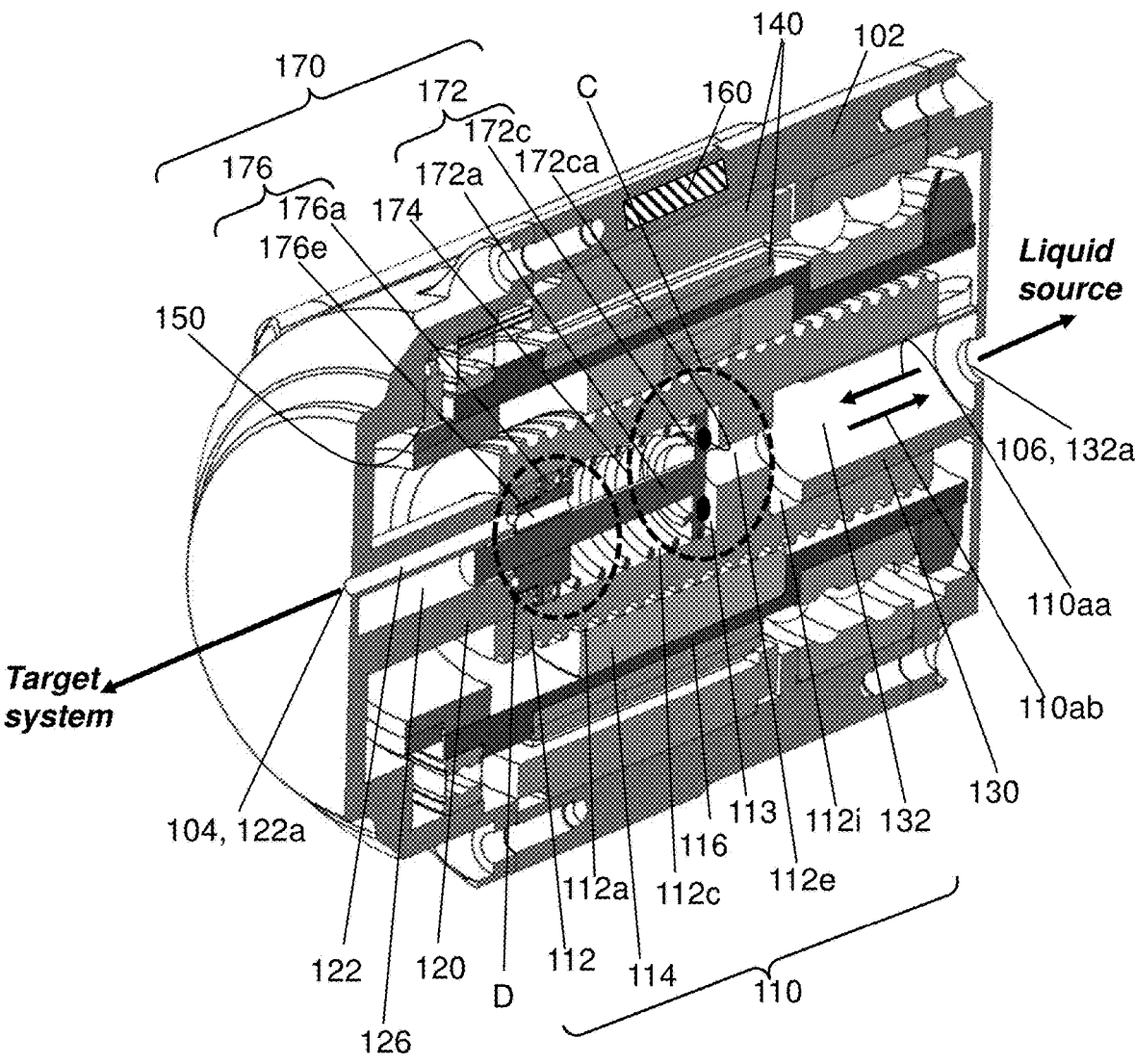
FIG. 2B is a 3D diagram of a perspective partial longitudinal section view of the hydraulic pump along line AA of FIG. 2A, according to some embodiments of the invention.

Reference is made to FIG. 2B, which is a 3D diagram of a perspective partial longitudinal section view of hydraulic pump 100 along line AA of FIG. 2A, according to some embodiments of the invention.

Figure 2C:
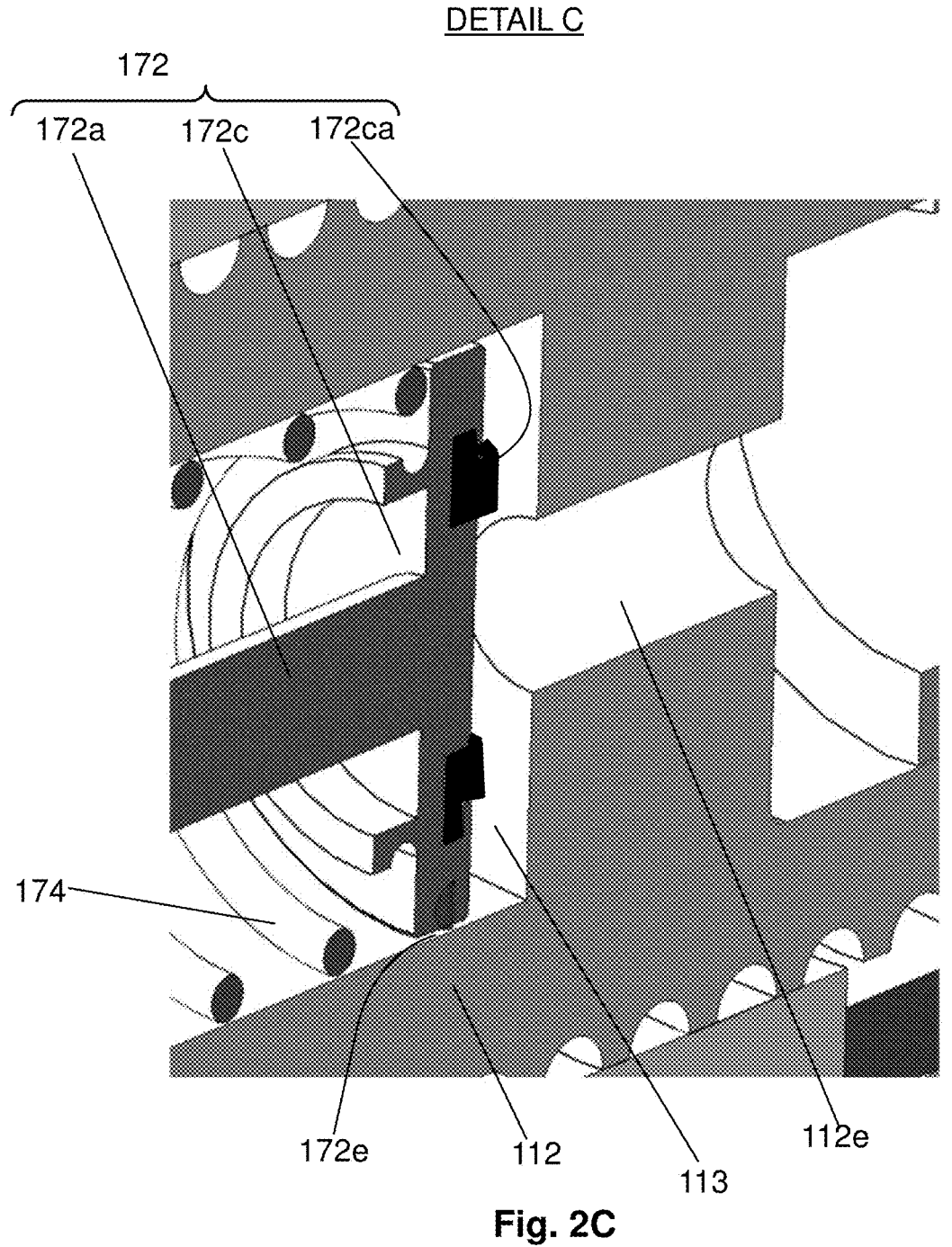
FIG. 2C is a 3D diagram of an enlarged portion C of FIG. 2B, according to some embodiments of the invention.

Reference is also made to FIG. 2C, which is a 3D diagram of an enlarged portion C of FIG. 2B, according to some embodiments of the invention.

Figure 2D:
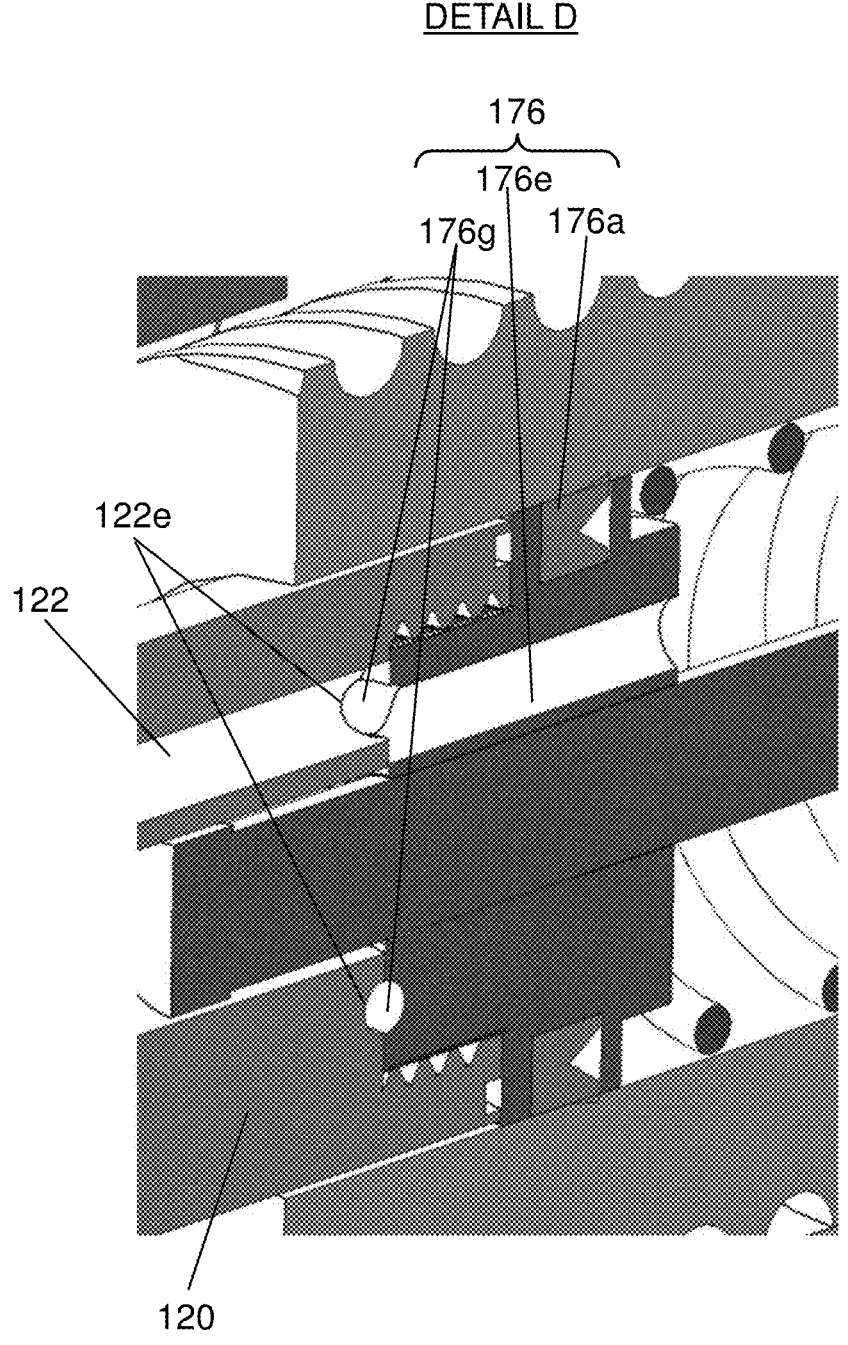
FIG. 2D is a 3D diagram of an enlarged portion D of FIG. 2B, according to some embodiments of the invention.

Reference is also made to FIG. 2D, which is a 3D diagram of an enlarged portion D of FIG. 2B, according to some embodiments of the invention.

Figure 2E:
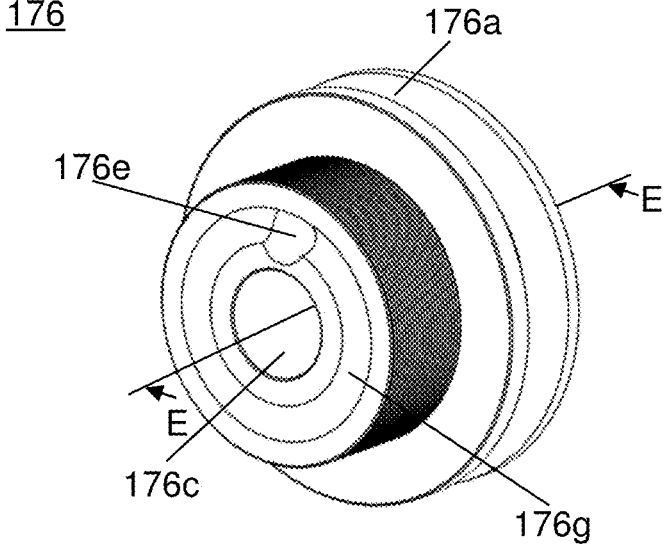
FIG. 2E is a 3D diagram of a sealing nut of the piston assembly, according to some embodiments of the invention.

Reference is also made to FIG. 2E, which is a 3D diagram of a sealing nut 176 of piston assembly 170, according to some embodiments of the invention.

Figure 2F:
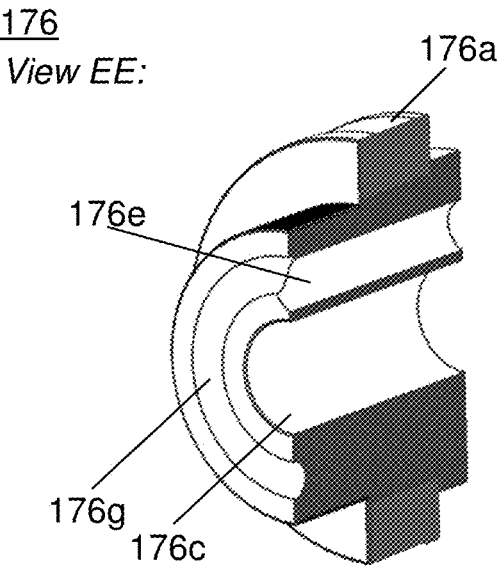
FIG. 2F is a 3D diagram of a partial longitudinal section view of the sealing nut along line EE of FIG. 2D, according to some embodiments of the invention.

Reference is also made to FIG. 2F, which is a 3D diagram of a partial longitudinal section view of sealing nut 176 along line EE of FIG. 2D, according to some embodiments of the invention.

Hydraulic pump 100 may include a piston assembly 170 (e.g., instead of valve 112*g* described above with respect to FIGS. 1A-1C). Piston assembly 170 may be at least partly positioned in, for example, first (e.g., pressure) tubular cavity 112*c* of screw 112. Piston assembly 170 may, for example, include a piston 172 having a shaft 172*a* and a piston head 172*c* connected to one end of shaft 172*a*. First (e.g., pressure) cylindrical tube 120 may further include a longitudinal receptacle 126 to receive a portion of shaft 172*a* of piston 172 to guide linear motion of piston 172 in first and second longitudinal directions 110*aa*, 110*ab*, respectively. Hollow channel 122 of first cylindrical tube 120 may be radially offset from longitudinal receptacle 126 (e.g., as shown in FIG. 2B). Hollow channel 122 may be parallel (or substantially parallel) to longitudinal receptacle 126 (e.g., as shown in FIG. 2B). Piston 172 may be loaded with a spring 174.

In some embodiments, piston assembly 170 includes a sealing nut 176 to seal first cylindrical tube 120 within first internal tubular cavity 112*c* of screw 112. Sealing nut 176 may be screwed or otherwise connected to an end of first cylindrical tube 120, the end that is positioned within tubular cavity 112*c* of screw 112. Sealing nut 176 may include a sealing member 176*a* (e.g., such as O-ring) on the external surface of sealing nut 176. Sealing nut 176 may include a first hollow channel 176*c* (e.g., indicated in FIGS. 2D and 2E) in fluid communication with longitudinal receptacle 126 of first cylindrical tube 120 and receives a longitudinal portion of shaft 172*a* of piston 172. First hollow channel 176*c* may, e.g., coincide with longitudinal receptacle 126 of first cylindrical tube 120. Sealing nut 176 may include a second hollow channel 176*e* in fluid communication (e.g., coinciding) with hollow channel 122 of first cylindrical tube 120 and establishes a fluid communication between hollow channel 122 of first cylindrical tube 120 and tubular cavity 112*c* of screw 112. Second hollow channel 176*e* may, e.g., coincide with hollow channel 122 of first cylindrical tube 120.

In some embodiments, sealing nut 176 includes a circumferential indent 176*g* positioned at the end connectable to first cylindrical tube 120 (e.g., as shown in FIGS. 2D, 2E and 2F), and first cylindrical tube 120 includes a circumferential indent 122*e* positioned at the end connectable to sealing nut 176 (e.g., as shown in FIG. 2D). Circumferential indents 176*g* of sealing nut 176 and circumferential indent 122*e* of first cylindrical tube 120 may ensure fluid communication between second hollow channel 176*e* of sealing nut 176 and hollow channel 122 of first cylindrical tube 120 for any angular position of sealing nut 176 with respect to first cylindrical tube 120 (e.g., as shown in FIG. 2D).

The diameter of piston head 172*c* may be greater than the diameter of the internal port 112*e* of screw 112. The diameter of piston head 172*c* may be smaller than the diameter of internal tubular cavity 112*c* of screw 112 such that a gap 172*e* is formed between the internal surface of internal tubular cavity 112*c* and the external side surface of piston head 172*c* (e.g., as shown in FIG. 2C). Piston head 172*c* may include a sealing member (e.g., O-ring) 172*ca*. Sealing member 172*ca* of piston head 172 may be disposed on a surface of piston head 172*c* that faces internal port 112*e* of screw 112. The diameter of sealing member 172*ca* may be greater than the diameter of the internal port 112*e* of screw 112 and smaller than the diameter of piston head 172*c*.

In operation, piston assembly 170 may operate as a valve that may open and close internal port 112*e* of screw 112 by piston head 172*c* to control flow of liquid through internal port 112*e*, e.g., as described above with respect to FIGS. 1A, 1B and 1C. When internal port 112*e* is open, the liquid may flow through gap 172*e* in first and second longitudinal directions 110*aa*, 110*ab*, respectively, depending on direction of rotation of nut 114 with respect to screw 112 of screw-nut assembly 110 (e.g., as described above with respect to FIGS. 1A, 1B and 1C). If it is desired to drive liquid from the liquid source to the target system, controller 160 may control motor 140 to rotate nut 114 in the first rotation direction to cause linear motion of screw 112 in first longitudinal direction 110*aa*, e.g. towards piston head 172*c* of piston assembly 170, to close a longitudinal gap 113 between piston head 172*c* and internal port 112*e* of screw 112 and shut internal port 112*e* by piston head 172*c*. Shutting longitudinal gap 113 between piston head 172*c* and internal port 112*e* of screw 112 by piston head 172*c* prevent back flow of liquid in second longitudinal direction 110*ab* from first internal tubular cavity 112*c* to second internal tubular cavity 112*i*. Linear motion of screw 112 in first longitudinal direction 110*aa* and prevention of backflow of liquid in second longitudinal direction 110*ab* may generate a total positive pressure gradient in first longitudinal direction 110*aa* to drive the liquid from first internal tubular cavity 112*c* to the target system. If it desired to drive liquid from the target system to the liquid source, controller 160 may control motor 140 to rotate nut 114 in the second rotation direction to cause linear motion of screw 112 in second longitudinal direction 110*ab* and to open longitudinal gap 113 between piston head 172*c* and internal port 112*e* of screw 112 to allow the liquid to flow in second longitudinal direction 110*ab* from to first internal tubular cavity 112*c* to second internal tubular cavity 112*i*. In operation, piston assembly 170 may act as a pressure compensation mechanism by compensating or damping pressure fluctuations within first (e.g., pressure) internal tubular cavity 112*c* of screw 112.

Figure 3A:
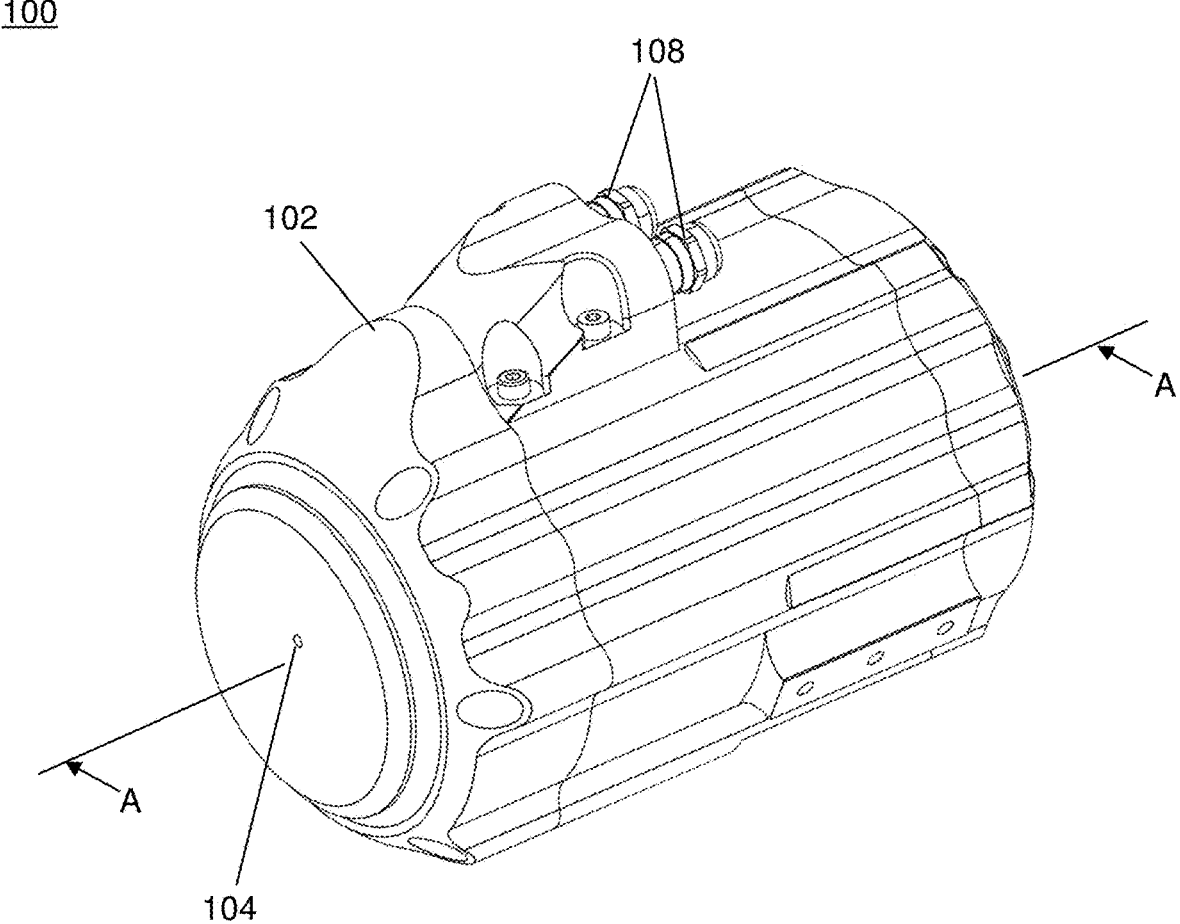
FIG. 3A is a 3D diagram of the hydraulic pump including a rigid conduit coupled within a screw of a screw-nut assembly, according to some embodiments of the invention.

Reference is made to FIG. 3A, which is a 3D diagram of hydraulic pump 100 including a rigid conduit 118 coupled within screw 112 of screw-nut assembly 110, according to some embodiments of the invention.

Figures 3B, 3C:
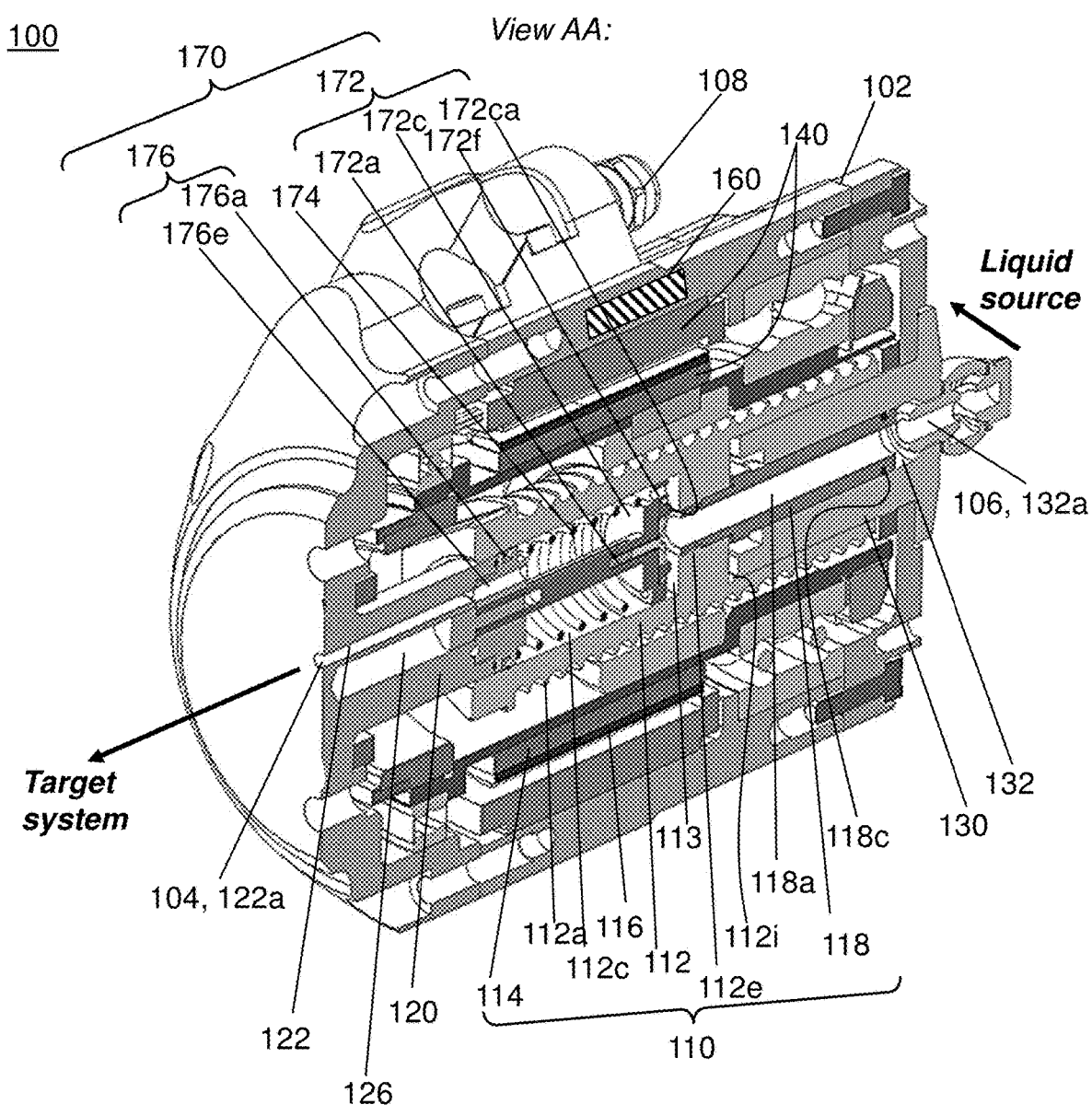
FIG. 3B is a 3D diagram of a perspective partial longitudinal section view of the hydraulic pump along line AA of FIG. 3A, according to some embodiments of the invention.
FIG. 3C is a 3D diagram of a piston of the piston head assembly, according to some embodiments of the invention.

Reference is also made to FIG. 3B, which is a 3D diagram of a perspective partial longitudinal section view of hydraulic pump 100 along line AA of FIG. 3A, according to some embodiments of the invention.

Reference is also made to FIG. 3C, which is a 3D diagram of piston 172 of piston head assembly 170, according to some embodiments of the invention.

Screw-nut assembly 110 may include a rigid conduit 118. Rigid conduit may be coupled within screw 112 of screw-nut assembly 110. For example, one end of rigid conduit 118 may be coupled within internal port (e.g., channel) 112*e* of screw 112. Rigid conduit 118 may extend into second (e.g., source) internal tubular cavity 112*i* of screw 112. Rigid conduit 118 may extend into hollow channel 132 of second (e.g., source) cylindrical tube 130. As described above with respect to FIGS. 1A-1C, second cylindrical tube 130 may include hollow channel 132 including first port 132*a* and second port 132*c*. In the example of FIGS. 3A-3C, second cylindrical tube 130 is removable insertable into the interior of housing 102 through a base surface of housing 102 (e.g., as shown in FIG. 3B). Hollow channel 132 of second cylindrical tube 130 and external surface of rigid conduit 118 may have matching transverse cross-sectional profiles, for example, circular, oval, curved, polygonal profiles or any other suitable profiles. Rigid conduit 118 may be rigidly coupled (e.g., fixated) within screw 112. Rigid conduit 118 may move together with screw 112. Rigid conduit 118 may include a hollow channel 118*a* extending through the entire length of rigid conduit 118. Rigid conduit 118 may include a sealing member 118*c* (e.g., such as O-ring or any other suitable sealing member). Sealing member 118*c* may be disposed on the external surface of rigid conduit 118. Sealing member 118*c* may seal rigid conduit 118 within hollow channel 132 of second cylindrical tube 130. Rigid conduit 118 sealed within hollow channel 132 of second cylindrical tube 130 by sealing member 118*c* may prevent leakage of the brake liquid from hydraulic pump 100. Rigid conduit 118 and second cylindrical tube 130 may slide with respect to each other during motion of screw 112. The sliding motion of rigid conduit 118 and second cylindrical tube 130 may control the volume of the liquid within hollow channels 118*a*, 132 of rigid tube 118 and second cylindrical tube 130, respectively, pressurize and depressurize the liquid in within hollow channels 118*a*, 132 and cause the liquid to flow between first internal tubular cavity 112*c* and second internal tubular cavity 112*i* of screw 112 (e.g., as described above with respect to FIGS. 1A-1C and 2A-2F).

In some embodiments, piston head 172*c* of piston 172 of piston assembly 170 includes a plurality of holes 172*f*. Holes 172*f* may be disposed, for example, along a circumference of piston head 172*c* or at any other suitable location of piston head 172*c*. When internal port 112*e* is open, the liquid to flow through holes 172*f* of piston head 172*c* in first and second longitudinal directions 110*aa*, 110*ab*, respectively, depending on direction of rotation of nut 114 with respect to screw 112 of screw-nut assembly 110, for example in addition to the flow of the liquid through gap 172*e* between the internal surface of internal tubular cavity 112*c* of screw 112 and the external side surface of piston head 172*c* (e.g., as described hereinabove). In another example, piston head 172*c* may be sealed within internal tubular cavity 112*c* of screw 112 and the liquid may flow only through holes 172*f*. As described above with respect to FIGS. 2A-2F, if it is desired to drive liquid from the liquid source to the target system, controller 160 may control motor 140 to rotate nut 114 in the first rotation direction to cause linear motion of screw 112 in first longitudinal direction 110*aa*, e.g. towards piston head 172*c* of piston assembly 170, to close longitudinal gap 113 between piston head 172*c* and internal port 112*e* of screw 112 and shut internal port 112*e* by piston head 172*c*. Shutting longitudinal gap 113 between piston head 172*c* and internal port 112*e* of screw 112 by piston head 172*c* prevent back flow of liquid in second longitudinal direction 110*ab* from first internal tubular cavity 112*c* to second internal tubular cavity 112*i*. Linear motion of screw 112 in first longitudinal direction 110*aa* and prevention of backflow of liquid in second longitudinal direction 110*ab* may generate a total positive pressure gradient in first longitudinal direction 110*aa* to drive the liquid from first internal tubular cavity 112*c* to the target system. If it desired to drive liquid from the target system to the liquid source, controller 160 may control motor 140 to rotate nut 114 in the second rotation direction to cause linear motion of screw 112 in second longitudinal direction 110*ab* and to open longitudinal gap 113 between piston head 172*c* and internal port 112*e* of screw 112 to allow the liquid to flow in second longitudinal direction 110*ab* from to first internal tubular cavity 112*c* to second internal tubular cavity 112*i*. In operation, piston assembly 170 may act as a pressure compensation mechanism by compensating or damping pressure fluctuations within first (e.g., pressure) internal tubular cavity 112*c* of screw 112.

In some embodiments, housing 102 of hydraulic pump may include one or more ports 108 disposed on an external surface of housing 102 (e.g., as shown in FIGS. 3A and 3B). Port(s) 108 may allow sealed connection of cables to, for example, motor 140 of hydraulic pump 100.

Figure 4A:
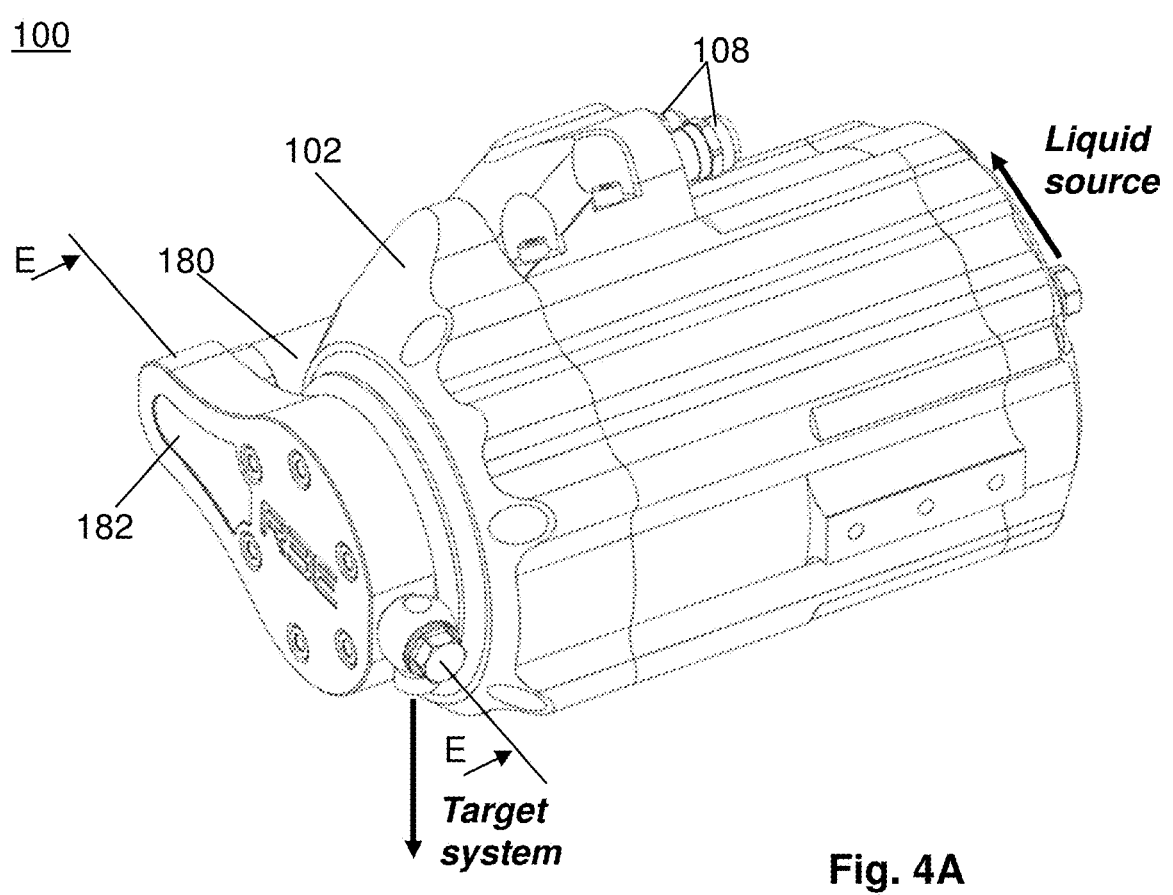
FIG. 4A is a 3D diagram of the hydraulic pump including a pressure sensor and a pressure sensor coupler, according to some embodiments of the invention.

Reference is made to FIG. 4A, which is a 3D diagram of hydraulic pump 100 including a pressure sensor 180 and a pressure sensor coupler 182, according to some embodiments of the invention.

Figure 4B:
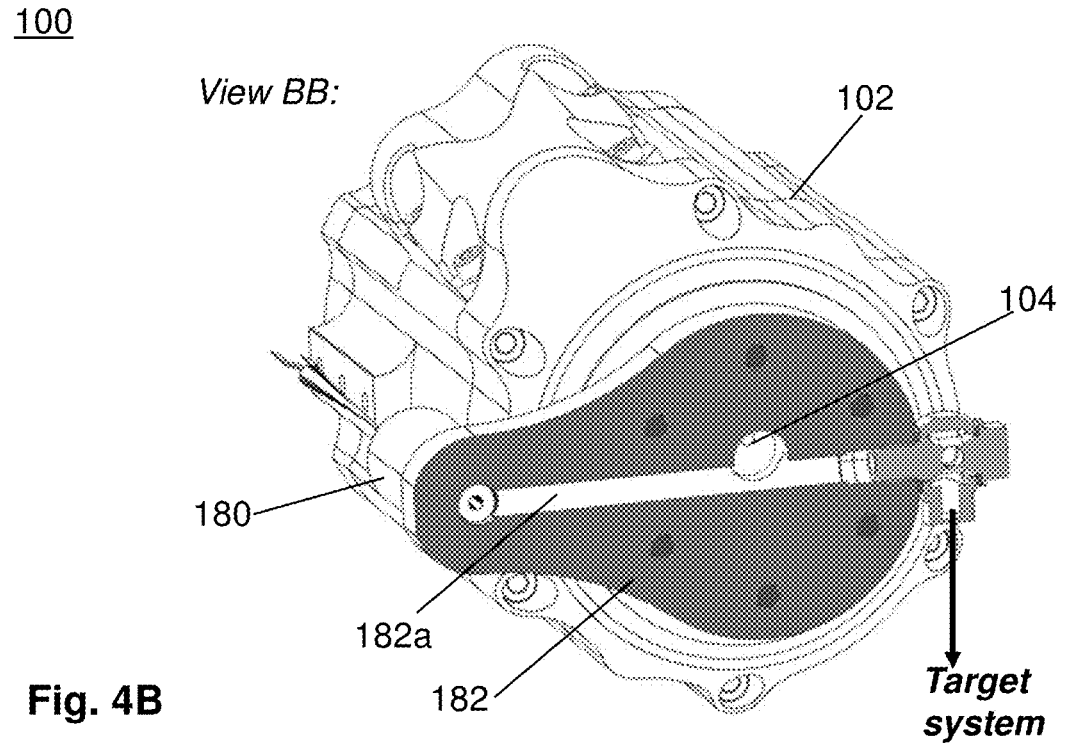
FIG. 4B is a 3D diagram of a partial transverse section view of the hydraulic pump along line EE of FIG. 4A, according to some embodiments of the invention.

Reference is also made to FIG. 4B, which is a 3D diagram of a partial transverse section view of hydraulic pump 100 along line EE of FIG. 4A, according to some embodiments of the invention.

Hydraulic pump 100 may include a pressure sensor 180 and a pressure sensor coupler 182. Pressure sensor 180 may be coupled to pressure sensor coupler 182. Pressure sensor coupler 182 may be coupled to housing 102. Pressure sensor coupler 182 may couple pressure sensor 180 to housing 102 of hydraulic pump 100. Pressure sensor coupler 182 may include a hollow channel 182*a*. Channel 182*a* may extend through pressure sensor coupler 182. Channel 182*a* may be in fluid communication with first port 104 of housing 102, pressure sensor 180 and the target system. Pressure sensor coupler 182 may allow easy and compact coupling of pressure sensor 180 to housing 102 of hydraulic pump 100. Pressure sensor coupler 182 may allow pressure sensor 180 to sense or measure pressure at hydraulic pump 100, for example instead or in addition to measuring pressure downstream or upstream hydraulic pump 100, such as at the caliper of the braking system or at a master cylinder.

Coupling of pressure sensor 180 to hydraulic pump 100 may eliminate the need for other pressure sensors such as a caliper pressure sensor as in prior art braking system, thus making the braking system that utilizes hydraulic pump 100 more compact as compared to prior art braking systems. Sensing pressure at hydraulic pump 100 by pressure sensor 180 instead of sensing the pressure at calipers as in prior art braking systems may allow hydraulic pump to be used with any type of calipers (e.g., with standard calipers that have no integrated pressure sensors). Sensing pressure at hydraulic pump 100 by pressure sensor 180 instead of sensing the pressure at calipers as in prior art braking systems may allow hydraulic pump 100 to pressurize more than one caliper at a time.

A controller, for example controller 160 of hydraulic pump and/or an external controller such as a controller of a wheel corner system of a controller of a vehicle platform, may control components of hydraulic pump 160, for example motor 140 or any other suitable components of hydraulic pump 160, based on signals from pressure sensor 180. For example, the controller may load motor 140 based on signals from pressure sensor 180 until the desired pressure value is reached.

Hydraulic pump 100 may be used in different vehicle systems, for example in vehicle brake systems as described hereinbelow.

Figure 5A:
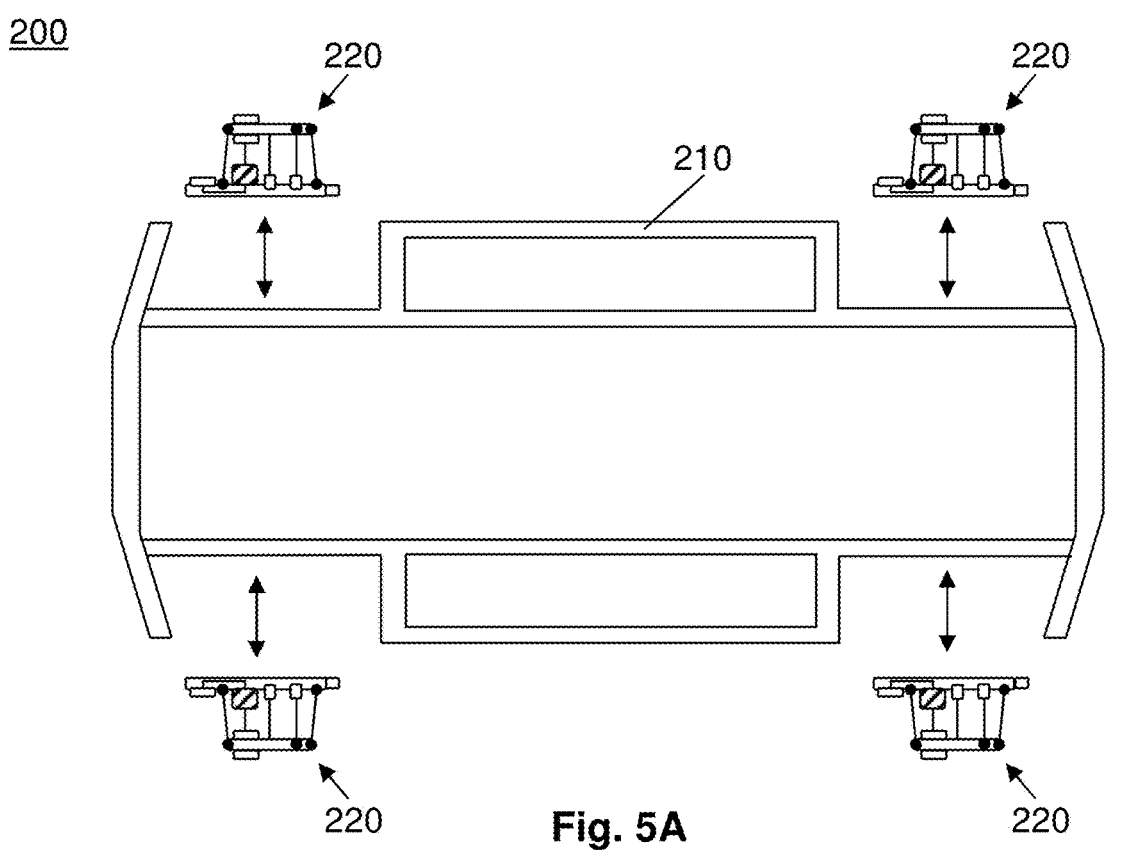
FIGS. 5A and 5B are schematic illustrations of a vehicle platform and wheel corner systems 220, according to some embodiments of the invention.
Figure 5B:
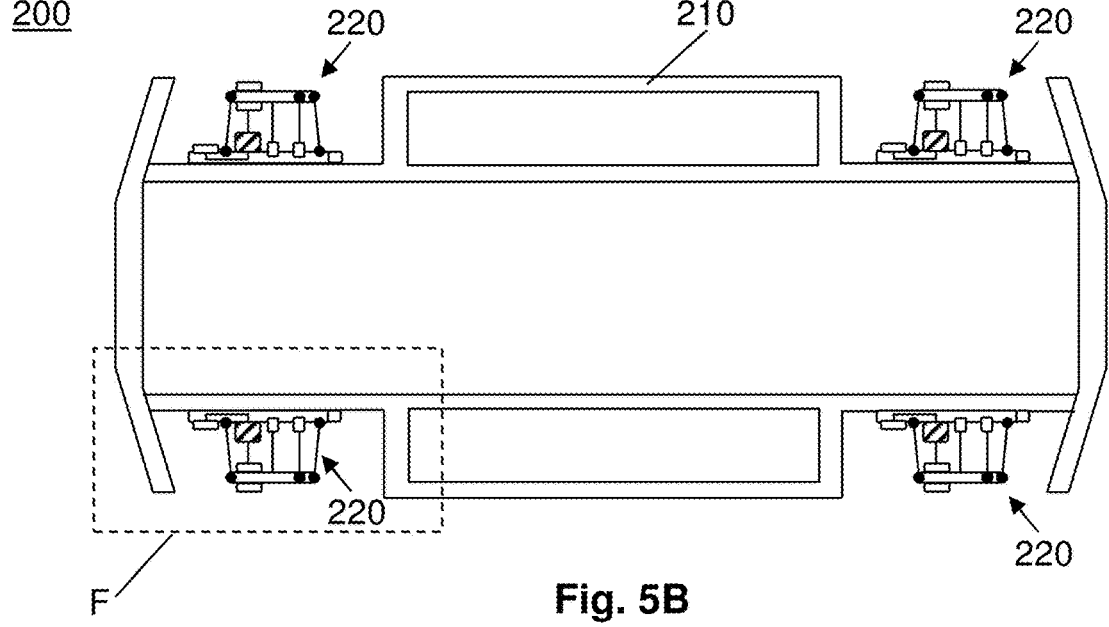

Reference is made to FIGS. 5A and 5B, which are schematic illustrations of a vehicle platform 200 and wheel corner systems 220, according to some embodiments of the invention.

Figure 5C:
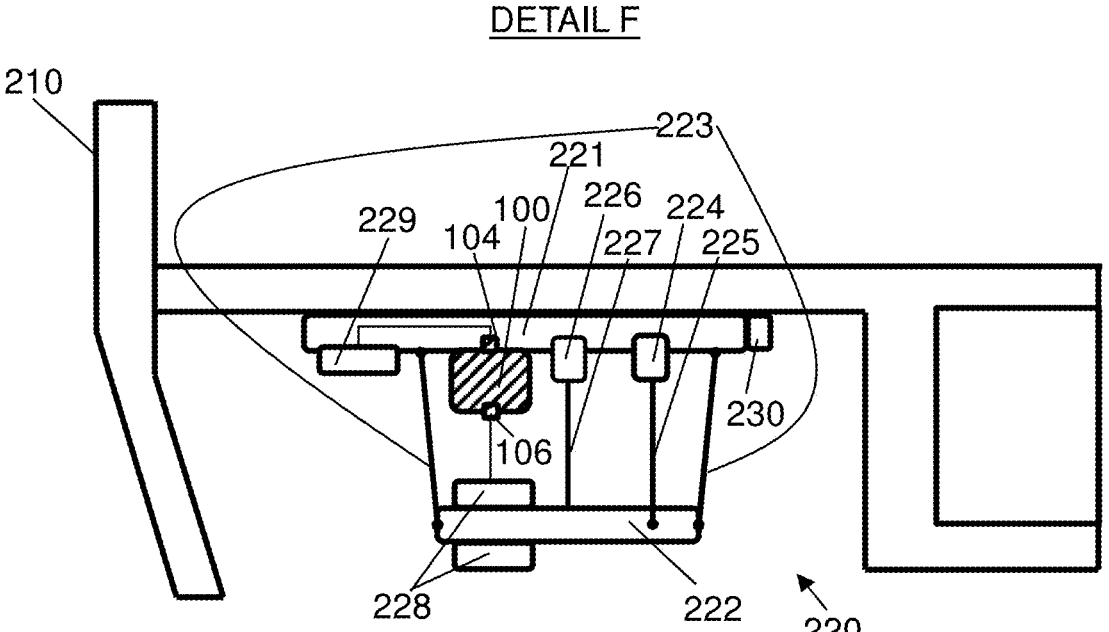
FIG. 5C is a schematic illustration of an enlarged portion F of FIG. 5B, according to some embodiments of the invention.

Reference is also made to FIG. 5C, which is a schematic illustration of an enlarged portion F of FIG. 5B, according to some embodiments of the invention.

Vehicle platform 200 may include a frame (e.g., chassis) 210 and wheel corner systems 220 coupled to frame 210. Wheel corner systems 220 may be removably plugged to frame 210. For example, FIGS. 5A and 5B show wheel corner systems 220 in an unplugged and plugged states with respect to frame 210, respectively. While four (4) wheel corner systems 220 are shown, vehicle platform 200 may include different number of wheel corner systems 220, for example, two (2) wheel corner systems 220 or more than four (4) wheel corner systems 220.

In the example of FIGS. 5A-5C, wheel corner system 220 includes a sub-frame 221 to couple one or more components of wheel corner systems 220 to frame 210. In the same example, wheel corner system 220 includes a wheel hub 222 to couple a wheel to wheel corner system 220. In the same example, wheel corner system 220 includes a suspension subsystem including suspension arms 223. In the same example, wheel corner system 220 includes a steering subsystem including a steering actuator 224 and a steering rod 225. In the same example, wheel corner system 220 includes a drive subsystem including a drive motor 226 and drive a shaft 227. In the same example, wheel corner system 220 includes a brake subsystem including a brake actuator 228, a brake liquid reservoir 229 and hydraulic pump 100 (e.g., described above with respect to FIGS. 1A-1C and/or FIGS. 2A-2F and/or FIGS. 3A-3C and/or FIGS. 4A-4B) to circulate brake liquid between brake actuator 228 and brake liquid reservoir. Hydraulic pump 100 according to embodiments of the invention is compact as compared to hydraulic pumps being typically used in vehicle brake systems. Accordingly hydraulic pump 100 may be integrated within pluggable wheel corner system, such as wheel corner system 200. Wheel corner system 220 may, for example, include a controller 230. Controller 230 may, for example, control hydraulic pump 100 based on input signals from, e.g., a vehicle platform controller, to control a rotation rate, to circulate the brake liquid between brake liquid reservoir 229 and brake actuator 228 so as to control rotation rate of wheel hub 222 or stop rotation of wheel hub 222 of wheel corner system 200. Controller 230 may control hydraulic pump 100 to cause the brake subsystem act as, for example, an Anti-lock Braking System (ABS), Traction Control (TC) system, a Vehicle Stability Control (VSC) system or any other brake system.

While FIGS. 5A-5B show vehicle platform 200 having four similar wheel corner systems 220, different wheel corner systems may be used in vehicle platform 200. For example, a pair of front wheel corner systems may be different from a pair of rear wheel corner systems. It is noted that some wheel corner systems need not necessary include all the components as shown or described with respect to FIGS. 5A-5C or may include additional components that are not shown in FIGS. 5A-5C. For example, front wheel corner systems only may include steering subsystems and rear wheel corner systems only may include drive subsystems.

Hydraulic pump 100 may be used in vehicle systems other than vehicle brake systems. For example, hydraulic pump 100 may be used vehicle steering systems, vehicle suspension systems or any other suitable vehicle systems having hydraulic components. Hydraulic pump 100 may be used in any suitable systems having hydraulic components other than automotive systems.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:
1. A hydraulic pump comprising:
a screw comprising:
an internal tubular cavity, and an internal port in fluid communication with the internal tubular cavity;

a nut surrounding a longitudinal portion of the screw;

a cylindrical tube fitting within the internal tubular cavity of the screw, the cylindrical tube having a hollow channel that is in fluid communication with the internal tubular cavity of the screw; and a piston assembly positioned within the internal tubular cavity of the screw to control flow of liquid through the internal port, wherein the piston assembly comprises:

a spring-loaded piston, the spring-loaded piston comprising:

a shaft positioned and movable within a longitudinal receptacle in the cylindrical tube, and a piston head connected to one end of the shaft.

2. The hydraulic pump of claim 1, comprising a motor to rotate the nut about a longitudinal axis to cause linear motion of the screw with respect to the cylindrical tube.

3. The hydraulic pump of claim 1, comprising a housing accommodating the screw, the nut and the cylindrical tube.

4. The hydraulic pump of claim 3, wherein the cylindrical tube is rigidly connected to the housing and is static with respect to the screw.

5. The hydraulic pump of claim 1, wherein the screw comprises an internal source tubular cavity in fluid communication with the internal tubular cavity through the internal port of the screw.

6. The hydraulic pump of claim 5, comprising a source cylindrical tube fitting within the internal source tubular cavity of the screw, the source cylindrical tube comprising a hollow channel that is in fluid communication with the internal source tubular cavity of the screw.

7. The hydraulic pump of claim 6, comprising a rigid conduit rigidly coupled within the screw and extending into the internal source tubular cavity of the screw and the hollow channel of the source cylindrical tube, the rigid conduit comprising a hollow channel extending through the length of the rigid conduit.

8. The hydraulic pump of claim 7, comprising a sealing member on an external surface of the rigid conduit, the sealing member sealing the rigid conduit within the hollow channel of the source cylindrical tube.

9. The hydraulic pump of claim 6, wherein the source cylindrical tube and the internal source tubular cavity comprise mating longitudinal protrusion and longitudinal groove.

10. The hydraulic pump of claim 5, wherein linear motion of the screw generates pressure difference between the internal tubular cavity and the internal source tubular cavity.

11. The hydraulic pump of claim 2, wherein the motor is a direct drive motor.

12. The hydraulic pump of claim 1, comprising a sealing member to seal the cylindrical tube within the internal tubular cavity of the screw.

13. The hydraulic pump of claim 1, comprising a sensor to generate signals indicative of at least one of an occurrence, direction, position and velocity of the screw.

14. The hydraulic pump of claim 1, comprising a pressure gauge in fluid communication with at least one of two or more ports of the cylindrical tube.

15. The hydraulic pump of claim 2, comprising a controller to control the motor.

16. The hydraulic pump of claim 1, comprising a valve positioned at the internal port of the screw to control flow of liquid through the internal port.

17. The hydraulic pump of claim 1, wherein the diameter of the piston head is:

greater than the diameter of the internal port, and smaller than the diameter of the internal tubular cavity such a gap is formed between an internal surface of the internal tubular cavity and an external side surface of the piton head.

18. The hydraulic pump of claim 1, wherein the hollow channel of the cylindrical tube is parallel to and radially offset with respect to the longitudinal receptacle.

19. The hydraulic pump of claim 1, wherein the piston assembly comprising a sealing nut connectable to one end of the cylindrical tube, the sealing nut comprising a sealing member on an external surface of the sealing nut to seal the cylindrical tube with respect to the internal tubular cavity of the screw.

20. The hydraulic pump of claim 19, wherein the sealing nut comprising:

a first hollow channel in fluid communication with the longitudinal receptacle of the cylindrical tube and receiving a longitudinal portion of the shaft of the piston; and a second hollow channel in fluid communication with the hollow channel of the cylindrical tube and establishing fluid communication between the hollow chamber of the cylindrical tube and the internal tubular cavity of the screw.

21. The hydraulic pump of claim 1, wherein the piston assembly is to damp pressure fluctuations within the internal tubular cavity of the screw.

22. The hydraulic pump of claim 1, comprising:

a pressure sensor; and a pressure sensor coupler to couple the pressure sensor to a housing of the hydraulic pump, the pressure sensor coupler comprising a hollow channel extending through the pressure sensor coupler and being in fluid communication with the pressure sensor and the internal tubular cavity of the screw.

23. A brake system comprising:

a brake liquid reservoir;

a brake actuator; and the hydraulic pump according to claim 1, the hydraulic pump being in fluid communication with the brake liquid reservoir and the brake actuator.

24. The brake system of claim 23, comprising a controller to control the hydraulic pump to circulate brake liquid between the brake liquid reservoir and the brake actuator.

25. A wheel corner system comprising:

a sub-frame;

a wheel hub rotatably coupled to the sub-frame;

a brake liquid reservoir coupled to the sub-frame;

a brake actuator coupled to the wheel hub; and the hydraulic pump according to claim 1, the hydraulic pump being coupled to the sub-frame and being in fluid communication with the brake liquid reservoir and the brake actuator.

26. The wheel corner system of claim 25, comprising a controller to control the hydraulic pump to circulate brake liquid between the brake liquid reservoir and the brake actuator so as to control rotation rate of the wheel hub.

* * * * *